United States Patent
Townsend

(10) Patent No.: US 9,371,040 B2
(45) Date of Patent: Jun. 21, 2016

(54) PIVOTING ROOF RACK

(71) Applicant: Joseph Townsend, East Marion, NY (US)

(72) Inventor: Joseph Townsend, East Marion, NY (US)

(*) Notice: Subject to any disclaimer, the term of this patent is extended or adjusted under 35 U.S.C. 154(b) by 635 days.

(21) Appl. No.: 13/798,620

(22) Filed: Mar. 13, 2013

(65) Prior Publication Data

US 2013/0248567 A1   Sep. 26, 2013

Related U.S. Application Data

(60) Provisional application No. 61/614,217, filed on Mar. 22, 2012.

(51) Int. Cl.
*B60R 9/042* (2006.01)
*B60R 9/045* (2006.01)

(52) U.S. Cl.
CPC ............ *B60R 9/045* (2013.01); *B60R 9/042* (2013.01)

(58) Field of Classification Search
CPC .... B60R 9/042; B60R 9/0423; B60R 9/4026; B60R 9/045
USPC .................................. 224/310, 321
See application file for complete search history.

(56) References Cited

U.S. PATENT DOCUMENTS

| | | |
|---|---|---|
| 3,013,681 A | 12/1961 | Garnett |
| 3,193,124 A | 7/1965 | Essling |
| 3,596,788 A * | 8/1971 | Willie ............... E04H 15/06 414/462 |
| 3,963,136 A | 6/1976 | Spanke |
| 4,003,485 A | 1/1977 | Edgerton |
| 4,003,486 A | 1/1977 | Shoemaker |
| 4,081,095 A | 3/1978 | Wilburn et al. |
| 4,225,069 A * | 9/1980 | Breitschwerdt ......... B60R 9/12 211/70.5 |
| 4,240,571 A | 12/1980 | Ernst |
| 4,242,030 A | 12/1980 | Clement |
| 4,440,540 A | 4/1984 | Gottlieb et al. |
| 4,484,851 A | 11/1984 | Gottlieb et al. |
| 4,826,387 A | 5/1989 | Audet |
| 5,154,563 A | 10/1992 | Phillips |
| 5,284,282 A | 2/1994 | Mottino |
| 5,346,355 A | 9/1994 | Riemer |
| 5,360,150 A | 11/1994 | Praz |
| 5,417,358 A | 5/1995 | Haselgrove |
| 5,421,495 A | 6/1995 | Bubik et al. |
| 5,425,650 A | 6/1995 | Maeda |

(Continued)

FOREIGN PATENT DOCUMENTS

| | | |
|---|---|---|
| EP | 0 014 185 | 8/1980 |
| EP | 0 287 269 | 10/1988 |

(Continued)

*Primary Examiner* — Justin Larson
*Assistant Examiner* — Scott McNurlen
(74) *Attorney, Agent, or Firm* — Collard & Roe, P.C.

(57) ABSTRACT

A vehicle roof rack for securing objects to the top of a vehicle having cross-bars mounted to the roof of the vehicle, has two pivot bars slidably connected to two load tubes. Each pivot bar is connected to a bracket via a hinge, and bracket is then mounted onto the cross-bars. Each of the load tubes has an interior cavity and the first ends of the pivot bars are slidably inserted within an end of the load tubes, so that the load tubes can be slid between an extended position and a closed position. Each load tube has a first portion with an open profile, and a second portion with a closed profile. In the extended position, the second portion of the load tube abuts the mounting bracket and acts as a stop to keep the load tube from freeing itself from the pivot bar.

15 Claims, 5 Drawing Sheets

(56) References Cited

U.S. PATENT DOCUMENTS

| | | | |
|---|---|---|---|
| 5,560,525 A | 10/1996 | Grohmann et al. | |
| 5,586,856 A | 12/1996 | Springer | |
| 5,673,821 A | 10/1997 | Davis et al. | |
| 5,690,259 A | 11/1997 | Montani | |
| 5,782,391 A | 7/1998 | Cretcher | |
| 5,884,824 A * | 3/1999 | Spring, Jr. | B60R 9/042 224/309 |
| 5,908,470 A | 6/1999 | Stonecypher, Jr. | |
| 6,105,841 A | 8/2000 | Aftanas | |
| 6,131,781 A | 10/2000 | Murray | |
| 6,158,638 A * | 12/2000 | Szigeti | B60R 9/042 224/310 |
| 6,315,181 B1 | 11/2001 | Bradley et al. | |
| 6,427,888 B1 | 8/2002 | Condon et al. | |
| 6,428,263 B1 | 8/2002 | Schellens | |
| 6,520,393 B1 | 2/2003 | Ferguson | |
| 6,561,396 B2 | 5/2003 | Ketterhagen | |
| 6,634,529 B2 | 10/2003 | Choiniere et al. | |
| 6,681,970 B2 | 1/2004 | Byrnes | |
| 6,766,928 B2 | 7/2004 | Aftanas et al. | |
| 7,048,490 B2 | 5/2006 | Henderson | |
| 7,108,162 B2 | 9/2006 | Stadler et al. | |
| 7,226,266 B2 | 6/2007 | Henderson et al. | |
| 7,341,418 B2 | 3/2008 | Ito | |
| 7,513,730 B2 * | 4/2009 | Goyanko | B60R 9/042 224/310 |
| 7,780,050 B2 | 8/2010 | Tucker | |
| 2002/0084297 A1 | 7/2002 | Williams et al. | |
| 2006/0133914 A1 * | 6/2006 | Derks | B60R 9/042 414/462 |
| 2006/0285954 A1 * | 12/2006 | Neary | B60R 9/042 414/465 |
| 2007/0090139 A1 | 4/2007 | McKenzie | |
| 2007/0156122 A1 | 7/2007 | Cooper | |
| 2008/0035688 A1 | 2/2008 | Malone | |
| 2009/0101685 A1 * | 4/2009 | Robb | B60R 9/065 224/495 |
| 2011/0038698 A1 * | 2/2011 | Li | B60P 3/14 414/479 |

FOREIGN PATENT DOCUMENTS

| | | |
|---|---|---|
| EP | 0 309 446 | 9/1991 |
| EP | 0 559 717 | 9/1993 |
| EP | 1 077 159 | 2/2001 |
| EP | 1 127 745 | 4/2004 |
| EP | 1 104 718 | 3/2005 |
| WO | WO 92/09453 | 6/1992 |

* cited by examiner

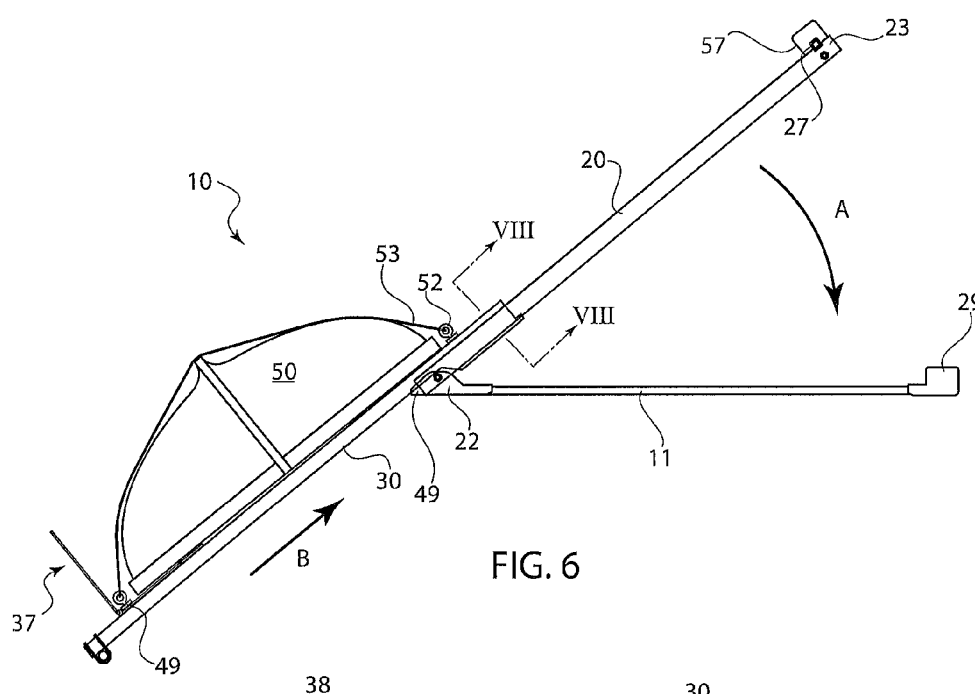
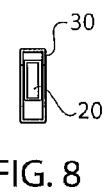
FIG. 8
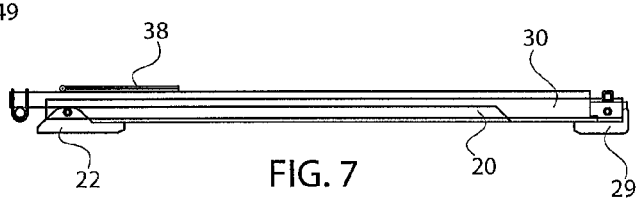
FIG. 7

PIVOTING ROOF RACK

CROSS-REFERENCE TO RELATED APPLICATIONS

This application claims priority under 35 USC 119(e) of U.S. Provisional Application Ser. No. 61/614,217, filed on Mar. 22, 2012.

BACKGROUND OF THE INVENTION

1. Field of the Invention

This invention relates to a pivoting roof rack for motor vehicles. In particular, the invention relates to a roof rack having extendable load tubes that can be pivoted downward off of the roof of the vehicle for loading heavy loads.

2. The Prior Art

Many people use rack systems on the roofs of their vehicles for carrying large loads. These rack systems generally consist of horizontal bars that extend across the roof and area attached to the vehicle's integrated support bars, or directly to the vehicle's roof. Additional components such as ski racks, boat racks, and bicycle racks can then be attached to these horizontal bars. The downside to these traditional rack systems is that it can often be very difficult to load large, heavy items, such as boats and kayaks onto the roof of a car or truck.

Several attempts have been made to provide rack systems that pivot downward to provide a way to attach boats or other large items to the rack system below the top of the roof, and then place the rack system back onto the roof. This alleviates the need to carry the heavy items up to the top of vehicle roof.

U.S. Pat. No. 5,782,391 to Cretcher shows a vehicle roof rack loading mechanism where a lift member can be slid outward from the vehicle roof, pivoted downward to allow for loading, and then slid back across the roof and locked in place. The lift member is slid though a support bracket that is attached to the roof of the car, and then secured to a cross-bar on the vehicle roof. The problem with this device is that the connection of the lift member to the bracket can generate a lot of friction, and it is still very difficult to lift heavy objects up onto the top of the roof.

SUMMARY OF THE INVENTION

It is therefore an object of the invention to provide a vehicle roof rack in which friction is reduced and heavy objects can be easily lifted up on top of the vehicle roof.

These and other objects are achieved by a vehicle roof rack for securing objects to the top of a vehicle having cross-bars mounted to the roof of the vehicle, in which the rack has two pivot bars slidably connected to two load tubes. Each pivot bar is connected at a first end to a bracket via a hinge, and bracket is then mounted onto standard vehicle cross-bars. Due to the hinge, the pivot bar can pivot between a position parallel to the cross-bars and a position almost perpendicular to the cross-bar. The bracket can be adapted to fit any type of vehicle cross-bar so that the rack can be used on any type of vehicle with any commercially available cross-bar.

Each of the load tubes has an interior cavity with a cross-section generally corresponding to a cross-section of each of the pivot bars. The ends of the pivot bars are slidably inserted within an end of the load tubes, so that the load tubes can be slid between an extended position and a closed position where the pivot bars are disposed almost entirely within the load tubes. Each load tube has a first portion with an open profile adjacent the far end of the load tube, and a second portion with a closed profile adjacent the end of the load tube into which the pivot bars are inserted. In the extended position, the second portion of the load tube abuts the mounting bracket and acts as a stop to keep the load tube from freeing itself from the pivot bar. The bracket and the near edge of the second portion of the load tube which abuts the bracket have matching angled profiles. This prevents the load tubes from pivoting to a position that is perpendicular to the bracket, and keeps the load tubes from touching the side of the vehicle in the extended, pivoted position, thus preventing any damage to the vehicle.

There is a draw bar connecting the two load tubes to each other at the far end of each load tube. The draw bar allows a user to simultaneously pull the two load tubes out to the extended position, and slide them back into the closed position.

Objects can be loaded onto the load tubes by pulling the load tubes out to the fully extended position and pivoting the load tubes downward by pulling down on the draw bar. In this lowered position, heavy objects are more easily loaded onto the load tubes. The load tubes can be equipped with apertures and mounting devices such as eye bolts for attachment of the objects. Preferably, a plate is mounted to the top of the load tubes for attachment of the eye bolts. Any other suitable attachment devices could also be used, for example clamps for skis or bicycles could also be mounted on the load tubes or plates in addition to or instead of the eye bolts. Because the load tubes have a length that is almost the same length as the width of the vehicle, the load tubes can be pivoted down to a point where they can be loaded at approximately waist height. This is a distinct advantage over other pivoting racks, which still must be loaded at shoulder height or higher. The load tubes can be configured in several different sizes, ranging from about 3 feet to over 5 feet in length, depending on the size of the vehicle.

Once the objects are loaded onto the load tubes, the load tubes can be pivoted upward around the hinge until the load tubes and pivot bars are disposed substantially horizontal. At this point, the load tubes can be slid onto the pivot bars until they are in the closed position. At this point, the objects are disposed centered on top of the vehicle.

In one embodiment, there is a stabilizing bar connected to the first ends of the pivot bars to connect the pivot bars together. This makes the entire rack more stable, as the bars cannot act independently of each other.

There can be a counterweight attached to the end of each pivot bar or the stabilizing bar to help balance the load when pivoting the fully loaded load tubes into the horizontal position. The counterweights can be of any desired weight, and can be interchangeable based on the amount of weight being loaded. The counterweights can be removed during transit.

There is a lock configured for locking each load tube in the extended position and in the closed position so that the load tubes do not slide during loading or transit. The lock can be in the form of a locking pin that engages into holes in the pivot bar and loading tube. Any other suitable locking device could also be used.

In order to make the sliding of the load tubes easier, the interior surface of each load tube or the exterior surface of each pivot bar is coated with a friction-reducing material, such as polyethylene, nylon or PTFE (polytetrafluoroethylene).

To assist in loading the objects onto the load tubes, there can be a load bracket attached to the far end of each load tube, the load bracket having a base section mounted to the load tube and disposed parallel to the load tube, and an extending section extending perpendicular to the load tube. This keeps the objects from sliding off of the load tubes before they are secured to the load tubes. Preferably, the extending section of the load bracket is hinged and foldable to be parallel with the base portion, so that the load bracket can be folded flat during storage of the rack.

In order to help pull the load tubes up into the horizontal position after being loaded with a heavy object, there can be a pulley system connected to the stabilizing bar and to the draw bar. One end of the rope is connected to the rails on the vehicle on the same side as the stabilizing bar, and the other end is threaded through a clamp or cleat system connected to draw bar. Thus, rather than push the load tubes upward, the user can pull on the rope threaded through the pulley system and the cleat to pull the load tubes into place. The pulley system can also pull the load tubes into the closed position once they are horizontal. The cleat can be used to lock the load tubes into the closed position once they are loaded onto the vehicle.

The rack system of the present invention provides a simple solution for loading heavy objects onto the top of a vehicle. It does not require the use of springs, pistons or motors, and has very few moving parts. Any type of object can be loaded onto the load tubes, generally by one person, without damaging the vehicle.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 6 shows the rack attached to a vehicle crossbar in the extended, pivoted position, with a boat mounted on the load tubes;

FIG. 7 shows the rack according to the invention in a storage position;

FIG. 8 shows a cross-section of a load tube and pivot bar, along lines VII-VII of FIG. 6;

DETAILED DESCRIPTION OF THE PREFERRED EMBODIMENT

Figure 1:
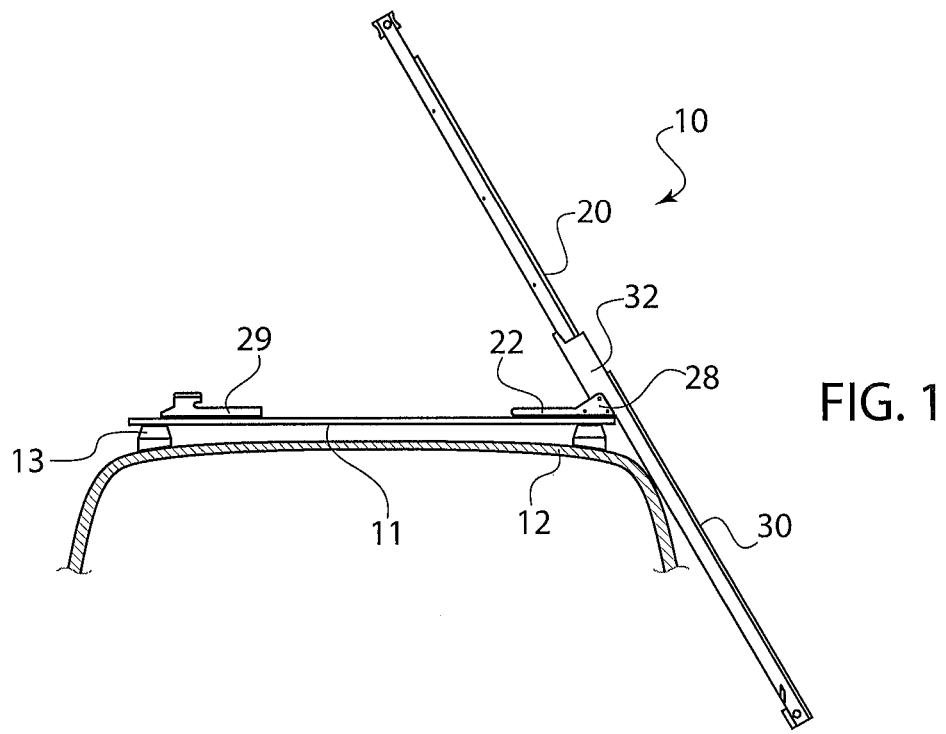
FIG. 1 shows a view of the roof of a vehicle with the rack according to the invention installed and in an extended, pivoted position.
Figure 2:
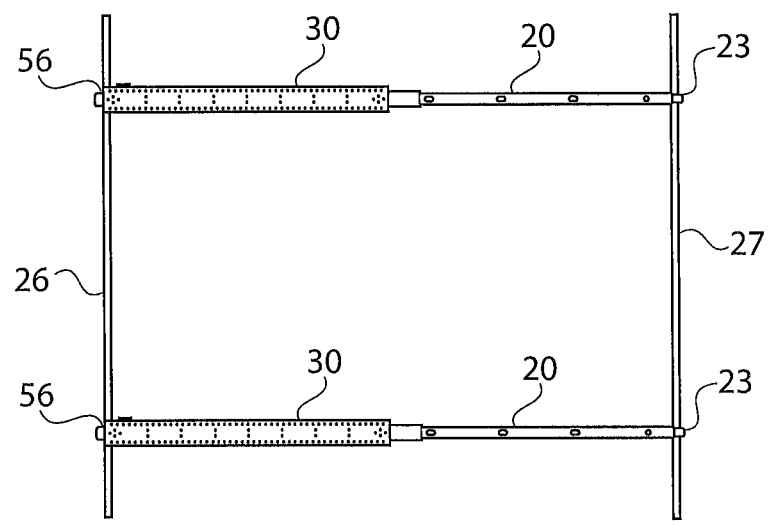
FIG. 2 shows a top view of the rack according to the invention in an extended position.

Referring now in detail to the drawings, FIGS. 1 and 2 show the rack 10 according to the invention in an extended position. Rack 10 consists of two pivot bars 20, which are slidably insertable into two load tubes 30. Pivot bar 10 is disposed slidable within load tube 20 so that rack 10 can be disposed in an extended position, as shown in FIG. 1, with load tube fully extended to a maximum position, and a closed position, as shown in FIG. 4, with pivot bar 20 disposed fully inside load tube 30.

Figure 3:
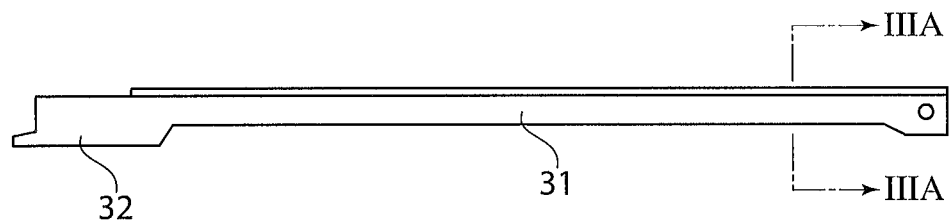
FIG. 3 shows a load tube for use in the rack according to the invention.
Figure 3A:
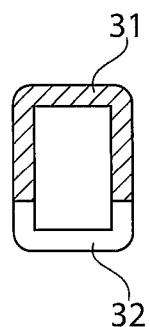
FIG. 3A shows a cross-section of the load tube along lines IIIA-IIIA of FIG. 3.

Load tubes 30 have a hollow interior cavity and a portion with an open profile 31 and a closed profile 32, as shown in FIGS. 3 and 3A.

Figure 1A:
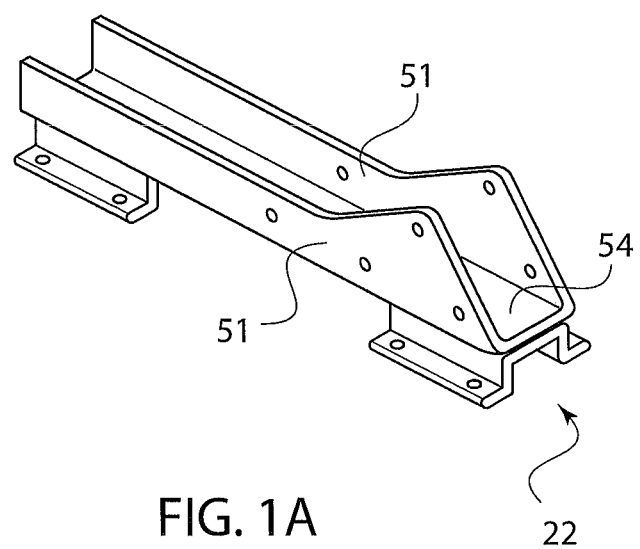
FIG. 1A shows a detail of the bracket for use in the rack according to the invention.
Figure 4:
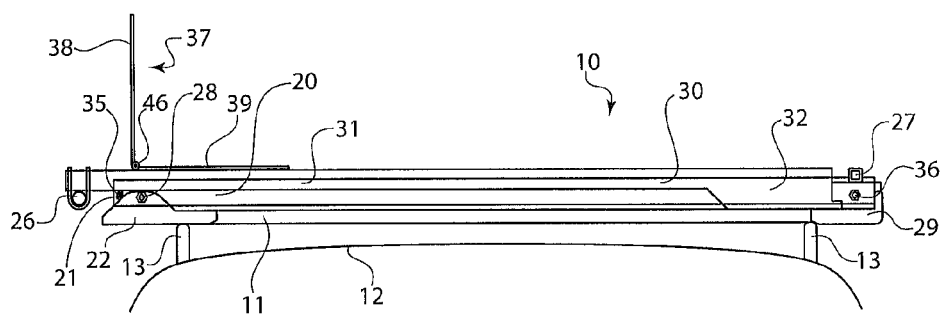
FIG. 4 shows a front view of the roof of a vehicle with the rack in a closed position.

As shown in FIGS. 1 and 4, pivot bar 20 is mounted at end 21 to a bracket 22, which is mounted on cross-bars 11 of vehicle 12. Cross-bars 11 can be any commercially available cross-bar that is mounted on the rails 13 of a vehicle 12. Bracket 22 has two side walls 51 with an angled profile and a bottom plate 54, as shown in FIG. 1A. To allow rack 10 to pivot between a horizontal and angled position, pivot bar 10 is connected to bracket 22 via a hinge 28. In the extended position, load tube 30 can be pulled out from pivot bar 20 until portion 32 abuts bracket 22, as shown in FIG. 1. The bottom of portion 32 acts as a stop and prevents load tube 30 from being pulled entirely free from pivot bar 20. The bottom of portion 32 is angled to match the angle of bracket 22 and prevents pivot bar 20 and load tube 30 from being pivoted beyond a predetermined angle. This prevents load tubes 30 from contacting the side of the vehicle during loading.

As shown in FIGS. 2 and 4, ends 56 of load tubes 30 are connected to a draw bar 26, which aids in moving load tubes 30 from an extended position to a closed position, as well as pivoting rack 10. Pivot bars 20 are also connected at ends 23 to stabilizing bar 27 on the other end of rack 10.

To lock load tubes 30 in the extended as well as in the closed position, a locking pin 35 can be inserted through pivot bar 20 and load tube 30 in either the extended as well as closed position. This prevents inadvertent movement of the load tube during loading and travel.

To secure rack 10 in place, an additional bracket 29 is mounted on the opposite side of the vehicle 12 from bracket 22. Bracket 29 is adapted to attach to pivot bar 20 and/or load tube 30 when the rack is in a closed position on top of vehicle 12, as shown in FIG. 4. A locking pin 36 can be used for this purpose.

Figure 5:
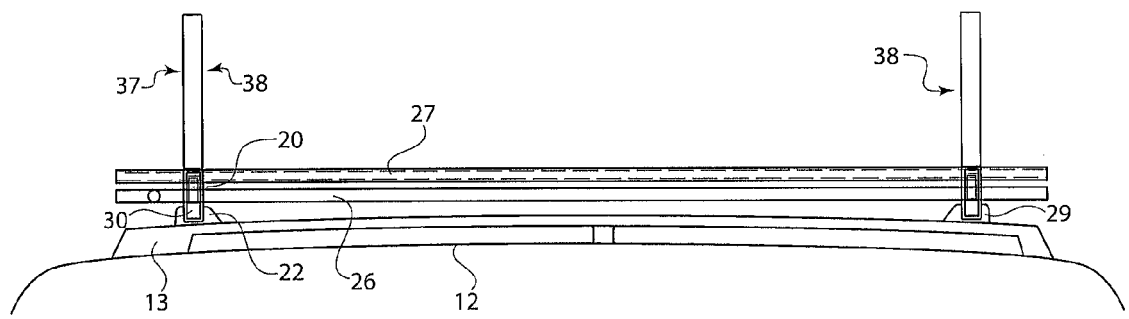
FIG. 5 shows a side view of the roof of a vehicle with the rack in a closed position.

To aid in positioning a large load onto load tubes 30, a hinged load bracket 37 is connected to an end of each load tube 30, as shown in FIGS. 4 and 5. Bracket 37 has a vertical portion 38 pivotally connected via hinge 46 to horizontal portion 39, which is attached to load tube 30.

A fully loaded rack 10 in the extended position is shown in FIG. 6. Here, a boat 50 has been loaded onto load tubes 30 and secured with a strap 53 through eye bolts 52, which are screwed into plates 49 on load tubes 30. Counterweight 57 can be positioned on stabilizing bar 27 to help tilt rack 10 into a horizontal position on top of cross-bar 11. Counterweights 57 can be removable. To load boat 50 onto the roof of a vehicle, first rack 10 is pivoted around hinge 28 in bracket 22 as shown in arrow A so that rack 10 is positioned horizontally. Then, load tube 30 is pushed onto pivot bar 20 along arrow B until boat 50 is positioned on top of the vehicle. Finally, the end of pivot bar 20 is secured into bracket 29 and locked with pin 36 to keep rack 10 in position on top of the vehicle.

As shown in FIG. 7, when not in use, rack 10 can be folded into a compact shape for storage, by folding down portion 38 of load bracket 37, and pushing load tube 30 all of the way onto pivot bar 20. Draw bar 26 and stabilizing bar 27 can be removed from load tubes 30 and pivot bars 20, respectively, so that the entire rack can be easily stored in an compact configuration.

As shown in FIG. 8, the interior cross-section of load tubes 30 is adapted to the exterior cross-section of pivot bars 20, so that load tubes 30 can be easily slid along pivot bars 20. In this embodiment, both load tubes 30 and pivot bars 20 are rectangular, but other shapes could also be used. Preferably, the exterior surfaces of pivot bars 20 are coated with an anti-friction coating, such as PTFE, polyethylene, nylon or any other suitable coating. This allows the load tubes to slide more easily along pivot bars 20, especially when a load is applied.

Figure 9:
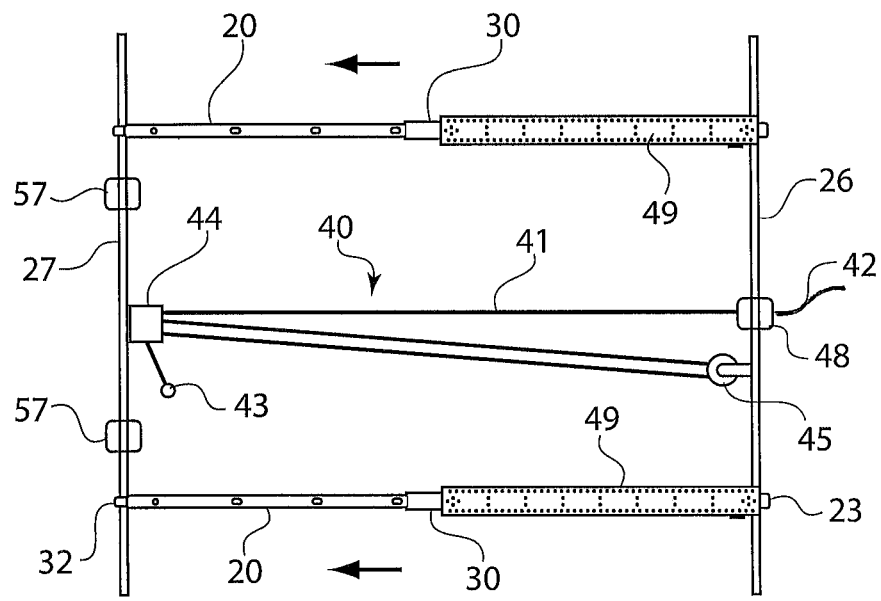
FIG. 9 shows the rack with a pulley system connected thereto.
Figure 10:
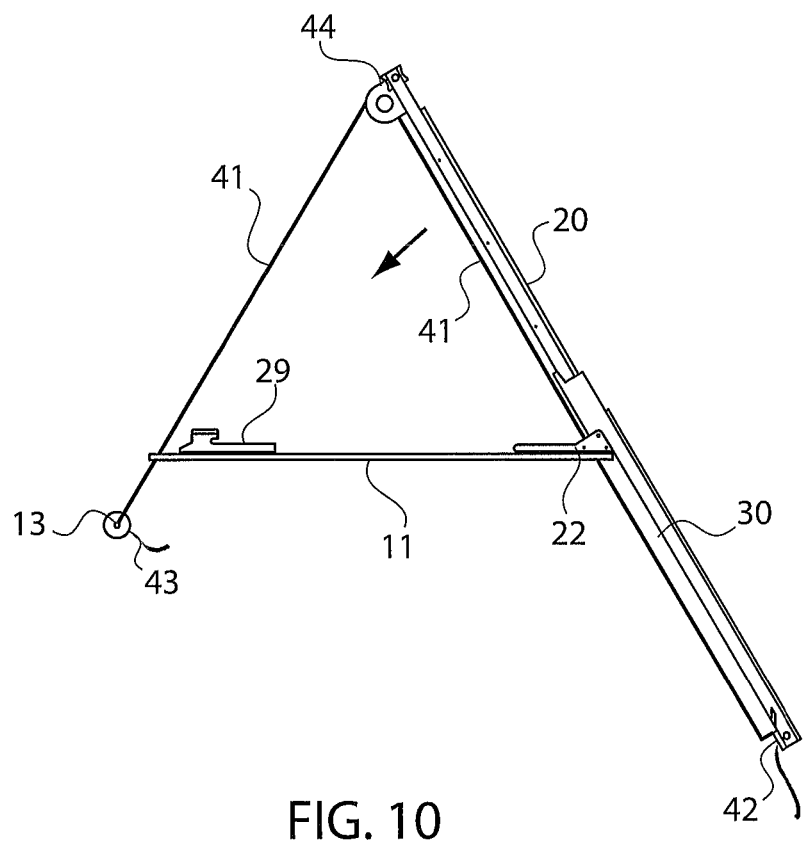
FIG. 10 shows the rack in an extended position with the pulley system and mounted on a vehicle.

FIGS. 9 and 10 show another embodiment of the invention, in which a pulley system 40 is attached to draw bar 26 and stabilizing bar 27. Pulley system 40 consists of a single pulley 45 on draw bar 26, a double pulley 44 on stabilizing bar 27, and a rope 41 threaded through pulleys 44 and 45. One end 43 of rope 41 is secured on rail 13 of vehicle 12, on the same side of the vehicle as stabilizing bar 27. The other end 42 of rope 41 is fed through a cleat 48 in draw bar 26. This way, pulling on end 42 of rope 41 causes rack 10 to pivot downward toward a horizontal position, and pulls draw bar 26 toward pulley 44, to pull rack 10 into the closed position. Rope 41 can then be locked in cleat 48 to hold rack 10 in the closed position. Pulley system 40 is especially useful for large, heavy loads, and when the vehicle roof is very high.

Accordingly, while only a few embodiments of the present invention have been shown and described, it is obvious that many changes and modifications may be made thereunto without departing from the spirit and scope of the invention.

What is claimed is:

1. A rack for securing objects to cross-bars mounted to the roof of a vehicle, the rack comprising:
   two mounting brackets having a bottom plate and two side walls each with an angled profile so that an end of each side wall is not perpendicular with a longitudinal direction of the bottom plate;
   two pivot bars, each pivot bar having a first end and a second end, the first end being pivotally attached to the side walls of a respective mounting bracket via a hinge, each mounting bracket being adapted for connection to one of the vehicle cross-bars;
   two load tubes, each load tube having a hollow rectangular cross-section, a first end, a second end, wherein the first ends of the pivot bars are slidably inserted within the second end of the load tubes, and wherein each load tube has a first portion with an open profile adjacent the first end of the load tube, and a second portion with a closed profile adjacent the second end of the load tube; and
   a draw bar connecting the two load tubes to each other at the first end of each load tube;
   wherein the load tubes are configured to be slid along the pivot bars between an extended position and a closed position, wherein in the extended position the second portion of each load tube abuts a respective mounting bracket and wherein in the closed position the pivot bars are disposed almost entirely within the load tubes, and wherein the second end of each of the load tubes is configured to have a corresponding shape with the angled profile of the sidewalls of the respective mounting bracket such that pivoting the pivot bars causes the second portion of each load tube to abut the angled profile of the sidewalls of the respective mounting bracket and prevent the pivot bars and load tubes from being pivoted beyond a predetermined angle.

2. The rack according to claim 1, further comprising a lock configured for locking each load tube in the extended position and in the closed position.

3. The rack according to claim 2, wherein the lock is in the form of a locking pin.

4. The rack according to claim 1, wherein an exterior surface of each pivot bar is coated with a friction-reducing material.

5. The rack according to claim 1, further comprising a plate attached to each load tube, wherein each plate has a plurality of apertures, and further comprising a plurality of mounting devices disposed in the apertures for securing objects to the plates.

6. The rack according to claim 1, further comprising a load bracket attached to the first end of each load tube, the load bracket having a base section mounted to the load tube and disposed parallel to the load tube, and an extending section extending perpendicular to the load tube.

7. The rack according to claim 6, wherein the extending section of the load bracket is hinged and foldable to be parallel with the base section.

8. The rack according to claim 1, further comprising a stabilizing bar connected to the first ends of the pivot bars.

9. The rack according to claim 8, further comprising at least one counterweight attached to the stabilizing bar.

10. The rack according to claim 9, wherein the at least one counterweight is removable.

11. The rack according to claim 8, further comprising a pulley system connected to the stabilizing bar and to the load tubes, the pulley system being adapted for pulling the load tubes into a closed position.

12. The rack according to claim 11, wherein the pulley system comprises a single pulley attached to the draw bar, a double pulley attached to the stabilizing bar, and a rope running through both pulleys, so that the rope runs through the double pulley then through the single pulley and back through the double pulley.

13. The rack according to claim 12, wherein the rope has one end extending through a cleat on the draw bar, and the other end is connectable to the vehicle.

14. The rack according to claim 1, wherein the interior cavity of each load tube has a cross-section generally corresponding to a cross-section of each of the pivot bars.

15. The rack according to claim 1, further comprising an additional bracket configured for attachment to the cross-bars of the vehicle and having a locking pin for locking the second end of the pivot bar to the bracket.

* * * * *